United States Patent [19]

Uchiyama et al.

[11] Patent Number: 5,415,029
[45] Date of Patent: May 16, 1995

[54] AIR FLOW DETECTOR FOR ENGINE CONTROL UNIT

[75] Inventors: Kaoru Uchiyama, Omiya; Mitsukuni Tsutsui, Naka; Tadao Suzuki, Hitachi, all of Japan

[73] Assignee: Hitachi, Ltd., Japan

[21] Appl. No.: 34,122

[22] Filed: Mar. 18, 1993

[30] Foreign Application Priority Data

Mar. 18, 1992 [JP] Japan .................. 4-062329

[51] Int. Cl.$^6$ ............... F02D 41/18; G01F 1/684; G01F 5/00
[52] U.S. Cl. ..................... 73/118.2; 73/202.5; 73/204.11; 73/861.02
[58] Field of Search ............... 73/116, 117.3, 861.02, 73/202.5, 204.11, 204.15, 204.17, 204.18, 204.19, 204.23, 204.25, 204.26, 204.27, 118.2

[56] References Cited

U.S. PATENT DOCUMENTS

| | | | |
|---|---|---|---|
| 3,992,940 | 11/1976 | Platzer, Jr. | 73/204.23 |
| 4,395,907 | 8/1983 | Morita et al. | 73/118.2 |
| 4,476,720 | 10/1984 | Ismail et al. | 73/204.17 |
| 4,571,996 | 2/1986 | Wakeman et al. | 73/202.5 |
| 4,637,253 | 1/1987 | Sekimura et al. | 73/204.23 |
| 4,677,850 | 7/1987 | Miura et al. | 73/204.23 |
| 4,776,214 | 10/1988 | Moran et al. | 73/204.11 |
| 4,790,182 | 12/1988 | Takahashi et al. | 73/202.5 |
| 4,821,700 | 4/1989 | Weibler et al. | 73/118.2 |
| 4,846,132 | 7/1989 | Binnewies | 73/118.2 |
| 4,884,215 | 11/1989 | Zboralski et al. | 73/118.2 |
| 4,911,008 | 3/1990 | Casey | 73/202.5 |
| 4,911,009 | 3/1990 | Maeda et al. | 73/204.11 |
| 4,922,879 | 5/1990 | Kaji et al. | 73/118.2 |
| 4,932,255 | 6/1990 | Brace et al. | 73/204.11 |
| 4,966,036 | 10/1990 | Woersinger | 73/118.2 |
| 5,108,193 | 4/1992 | Furubayashi | 73/204.11 |
| 5,293,553 | 3/1994 | Dudek et al. | 73/118.2 |

FOREIGN PATENT DOCUMENTS

63-134919 6/1988 Japan .

Primary Examiner—Richard E. Chilcot, Jr.
Assistant Examiner—George M. Dombroske
Attorney, Agent, or Firm—Evenson, McKeown, Edwards & Lenahan

[57] ABSTRACT

An exothermic resistor type air flow detector according to the invention is compact and requires no special radiation structure. A control circuit comprised of a transistor T and a differential amplifier are formed with an exothermal resistor Rh on an insulated substrate 2, which is placed in an air passage in which air current is to be measured.

31 Claims, 8 Drawing Sheets

AIR FLOW DETECTOR FOR ENGINE CONTROL UNIT

BACKGROUND AND SUMMARY OF THE INVENTION

The present invention pertains to an exothermic resistor type air flow detector suitable in particular for fuel control of automobile engines.

Air flow detectors are used in various areas, including process control at chemical plants and air conditioning systems for buildings. In automobiles, in particular, there is a need to accurately control the mixture of the fuel supply, for environmental protection purposes, as well as for resource conservation. For this reason, there is a growing need for an air flow detector that detects engine air intake. Such detectors are expected to become commonplace in the future.

One known air flow detector is the so-called heating resistor type, which detects the air flow from the heat value which it takes away from a heating resistor. However, mechanical strength and resistance against intrusions such as dust (maintaining precision of detection) are important attributes in an air flow detector of this type. For this reason, a detector that uses a laminar substrate with a filmy exothermic resistor formed on its surface has been proposed in the past, an example of which can be seen in Laid Open Japanese Patent Application No. 63-134919.

Such conventional technology requires a large amount of electricity for heating the exothermic resistor. However, heretofore no consideration has been given to the substantial heat generated in the control circuit that handles this heating electricity, and it has therefore been necessary to provide a large radiation structure in the control circuit, which has made it difficult to achieve a compact air flow detector design.

SUMMARY OF THE INVENTION

One objective of the present invention therefore is to provide an air flow detector that does not require a special heat radiating structure, and can be made compact without difficulty.

This and other objects and advantages are achieved according to the invention by placing the control circuit near the substrate in which an exothermic resistor is formed, and by placing the exothermic resistor, including this control circuit in the air flow to be detected. As the control circuit is exposed to the air flow, the heat which it generates is removed effectively by the air flow, thereby providing sufficient cooling without installing a special radiation structure. In addition, a sufficiently compact structure can be obtained, because a film structure can be realized by including the control circuit.

Other objects, advantages and novel features of the present invention will become apparent from the following detailed description of the invention when considered in conjunction with the accompanying drawings.

DETAILED DESCRIPTION OF THE DRAWINGS

Figure 1:
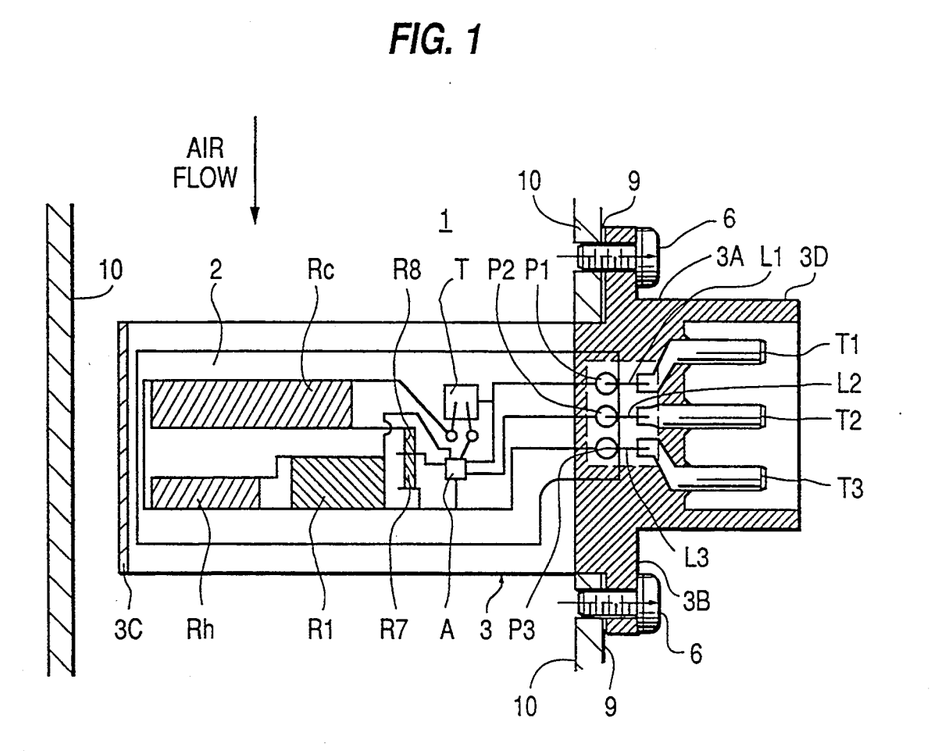
FIG. 1 is a vertical cross sectional view of an embodiment of an air flow detector according to the present invention.
Figure 2:
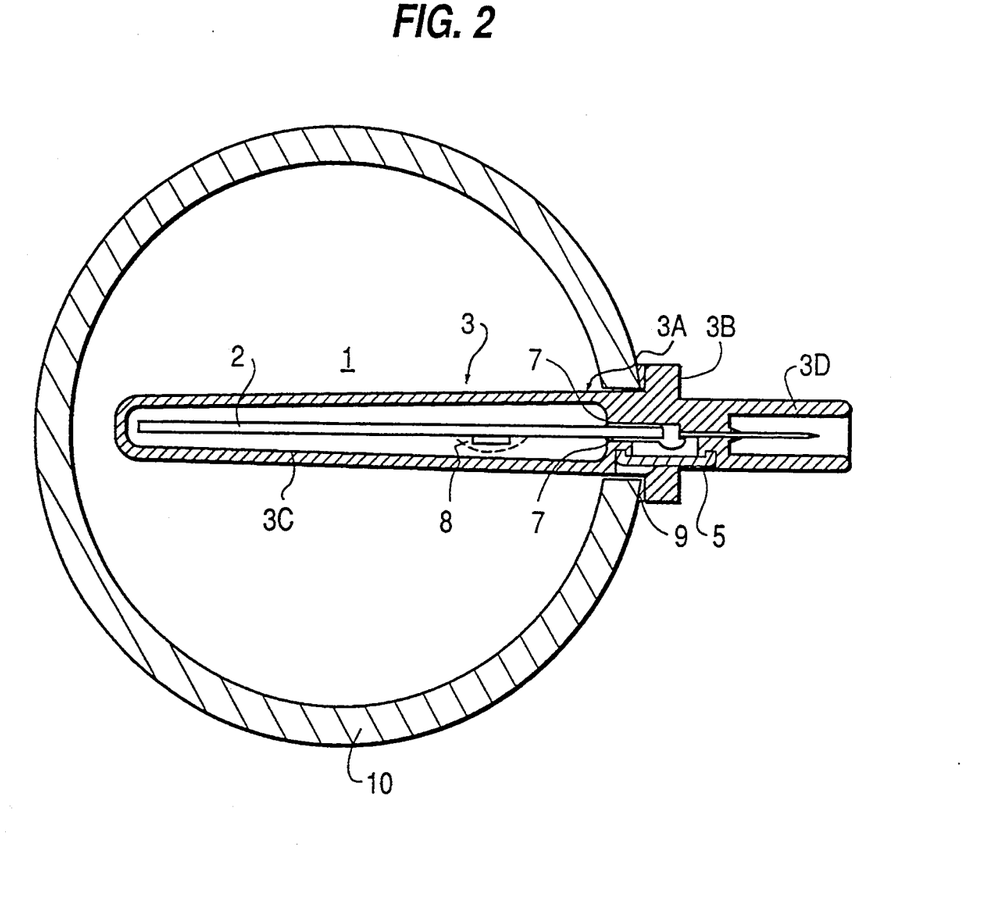
FIG. 2 is a horizontal cross sectional view of the air flow detector of FIG. 1.

FIGS. 1 and 2 show embodiments of the present invention applied to an intake air flow detector of an automobile engine. FIG. 1 is a cross section in a plane parallel to the direction of air current flow, while FIG. 2 is a cross section in a plane perpendicular to the direction of air flow. In these diagrams, 1 is an intake air flow detector according to the invention placed inside an air intake tube 10 that comprises a part of an engine air intake passage which guides the air flow to be detected.

An insulated substrate (insulating laminar part) 2 made of alumina ceramic is used in this embodiment, and contains elements and circuits that are necessary for the detector. A casing 3 made of molded plastic comprises a base section 3A, a flange section 3B, a case section 3C and a connector section 3D. Insulated substrate 2 is arranged inside case section 3C and fixed on base section 3A with an adhesive 7. A positive electric terminal T1, an output terminal T2 and a negative electricity terminal T3 are contained in the connector section 3D.

Pads P1 through P3 at the edge of insulated substrate 2 are in contact with the circuit formed on the substrate and serve to connect it with the terminals T1 through T3 inside connector section 3D, via wires L1 through L3. In addition, there is a window on casing 3 which affords access for connection of these wires L1 through L3. A cover 5 is fixed on this window with an adhesive after the connection work is completed.

A narrow opening is placed on the wall surface of air intake tube 10. The air flow detector 1 is mounted on the air intake tube 10 by inserting it into this opening from outside, with flange section 3B being held in place on the wall surface of the air intake tube 10 with a screw 6 via a packing 9.

Figure 3:
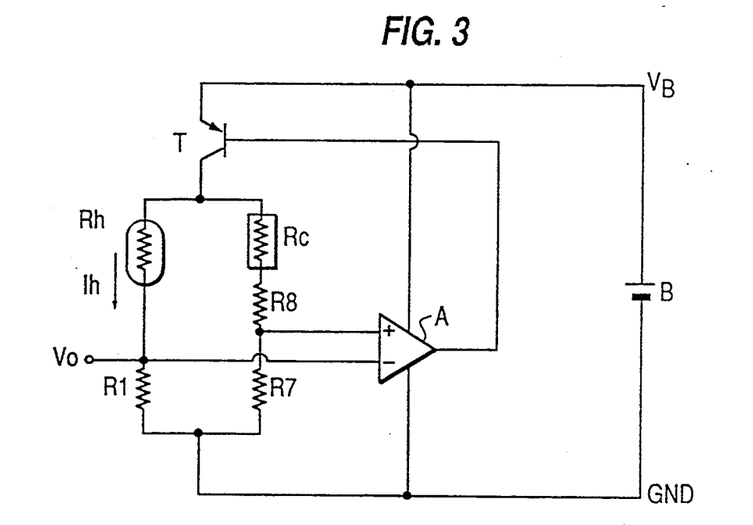
FIG. 3 is a circuit diagram of an example of a control circuit for the air flow detector according to the present invention.

FIG. 3 shows the detector circuit which is mounted on insulated substrate 2. Rh is an exothermic resistor (hot film) and the rest of the circuit corresponds to the control circuit in the embodiment. Rc is a resistor for air temperature detection (cold film) while R1, R7 and R8 are fixed film resistors, T is a transistor and A is a differential amplifier.

As shown in FIG. 1, exothermic resistor Rh and resistor Rc are formed on an insulated substrate 2 by a thick film using platinum or nickel print or a thin film using vaporization. Fixed film resistors R1, R7 and R8 are also formed on substrate 2, using nickel-chrome alloy for thin film with vaporization, and ruthenium tetroxide for thick film with print. The surface of these films (all resistors and conductors) are coated with glass. In addition, the surfaces of active components, transistor T and differential amplifier A, are covered with a coating resin 8 as shown in FIG. 2.

The operation of the air flow detector of FIGS. 1 to 3 is described mathematically in the following. The exothermic resistor Rh is controlled (as described hereinafter) to have the resistance value.

$$RH = R1 \cdot (R8 + RC)/R7 \qquad \text{Equation 1}$$

RH: Resistance value of resistor Rh
RC: Resistance value of an air temperature detection resistor Rc The resistance value RC, on the other hand can be expressed as:

$$RC = RCO(1 + \alpha Ta) \qquad \text{Equation 2}$$

RCO: Resistance value of Rc at a reference temperature
$\alpha$: Temperature coefficient
Ta: Ambient air temperature A heating electric current Ih is supplied to exothermic resistor Rh to heat it to a desired number of degrees higher than the air temperature Ta. The relationship between this heating electric current Ih and air flow Q is as follows:

$$Ih^2 RH = (A + B\sqrt{Q})(T - Ta) \qquad \text{Equation 3}$$

A, B: Constant
T: temperature of exothermic resistor Rh

Since heating electric current Ih is thus a function of air flow Q, a voltage signal Vo, which shows air flow, can be obtained from terminal T2 by detecting this electric current with a resistor R1.

The heating electric current Ih is determined by several factors, such as the structure, material and size of an insulated substrate 2 and exothermic resistor Rh. It can reach a magnitude of 10 mA to 100 mA, and occasionally rises to the order of several amps when applied to intake air flow detection of an automobile engine. This will result in extremely large consumption of electricity particularly by resistor R1 and transistor T, which means that there will be considerable rise in temperature unless sufficient radiation takes place.

Therefore, the entire control circuit (including resistor R1 and transistor T) is mounted on an insulated substrate 2 in this embodiment. As a result, the whole circuit is totally exposed to the intake air flow of the engine, taking advantage of significant cooling by the air flow, and the rise in temperature can be sufficiently restrained in a more compact control circuit, without installing a special radiation structure such as a cooling fin.

Figure 4:
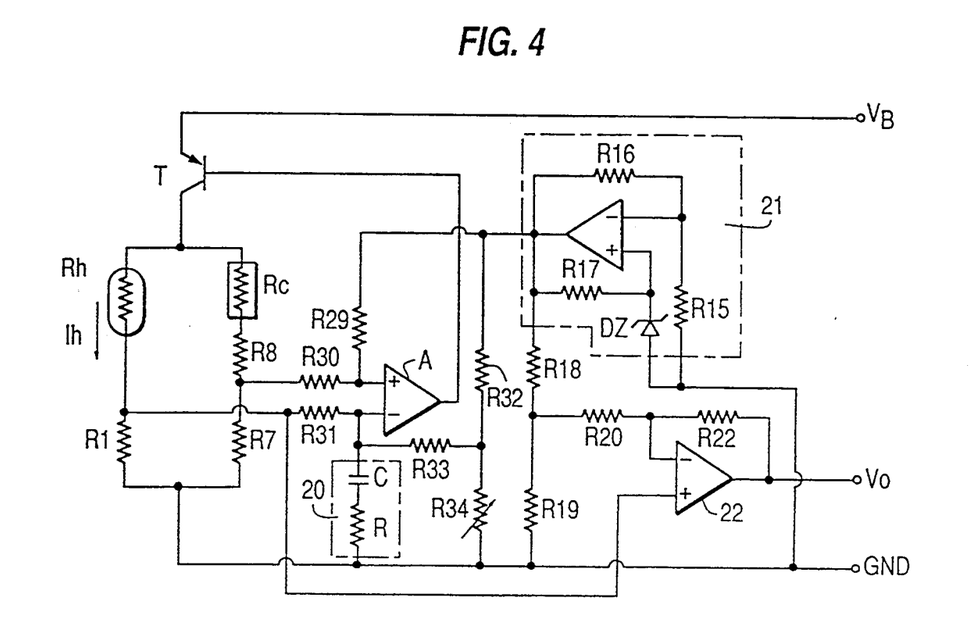
FIG. 4 is a circuit diagram of another example of a control for the air flow detector according to the present invention.

In the foregoing embodiment, the air flow detector circuit shown in FIG. 3 is mounted on an insulated substrate 2. Another embodiment is shown in FIG. 4 in which an R-C circuit 20, together with a differential amplifier A, improve the operational response of the bridge circuit comprised of exothermic resistor Rh, air temperature detection resistor Rc, and resistors R1, R7 and R8. That is, an exothermic resistor Rh has slow thermal response because it is formed as a film on the surface of an insulated substrate 2, which has a relatively high heat capacity. On the other hand, R-C circuit 20 can obtain a timely response output at a resistor R1 as a result, as it functions to delay the response of bridge circuit when there is a change in air flow.

Resistors R29 through R34 establish the offset voltage for a bridge circuit which includes a differential amplifier A. As feedback sensitivity of a heating current Ih against output voltage (Ih×R1) is changed after the offset voltage is changed by these resistors, the response against rapid change in air (start-up properties) can be maintained at a favorable state.

Finally, a reference voltage circuit 21 and an amplification circuit 22 are capable of changing the gain and offset of detection properties.

Therefore, the embodiment in which the circuit shown in FIG. 4 is mounted on fan insulated substrate 2 provides sufficient cooling effect and realizes a compact air flow detector with a simple structure.

In the foregoing embodiments with mounted circuits in FIGS. 3 and 4, air flow detection output is provided in the form of a voltage signal. However, a voltage signal is not always the desired air flow detection output, and there are cases where a frequency signal or digital signal is desired, depending on the operating environment, such as an engine control unit.

Figure 5:
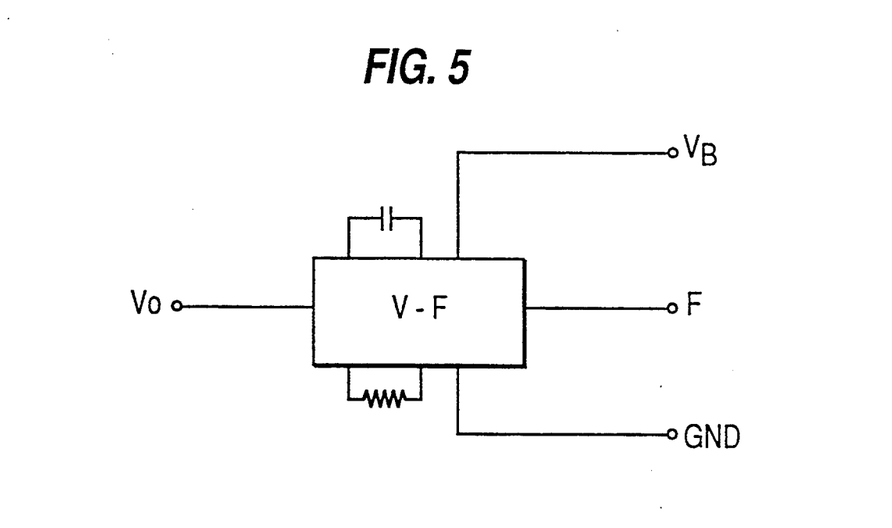
FIG. 5 is a circuit diagram of another example of a conversion circuit for the air flow detector according to the present invention.
Figure 6:
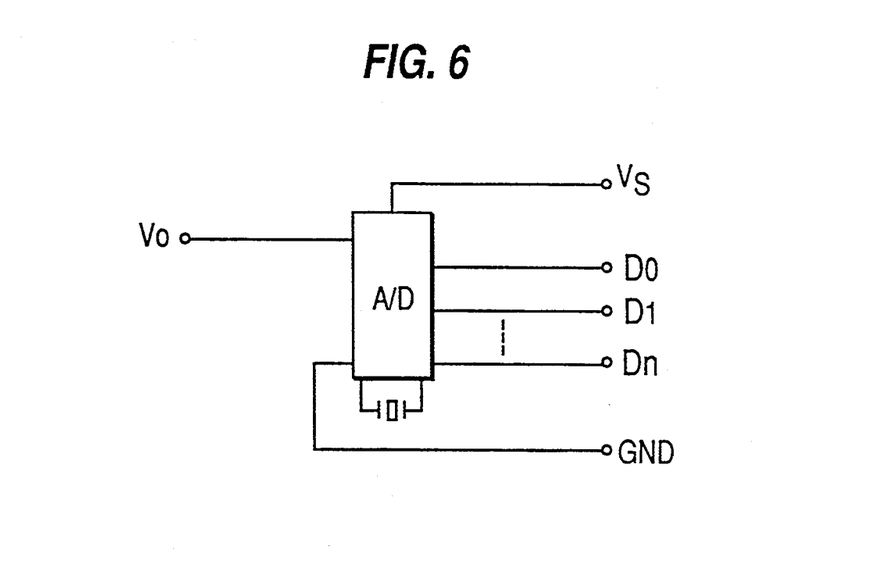
FIG. 6 is a circuit diagram of another example of a conversion circuit for the air flow detector according to the present invention.

FIG. 5 is an embodiment of a conversion circuit suitable for use when an air flow detection circuit is given as a frequency signal. For this purpose, a voltage-frequency conversion circuit V-F is coupled to the voltage output Vo in FIGS. 1 and 3. FIG. 6 is a conversion circuit which provides a digital readout, using an analog-digital conversion circuit A/D. Both of these embodiments are mounted on an insulated substrate 2 along with the circuit in FIG. 3 or FIG. 4, and operate by using a voltage signal Vo (which shows air current) as input and outputting frequency signal F or digital signal Do~Dn. In the embodiment of FIG. 6, it is of course apparent that the increase in the number of output terminals corresponds to the number of bits required. Since, air flow can thus be output as a frequency signal or digital signal according to embodiments in FIGS. 5 and 6, the present invention can be applied regardless of the nature of the component that will be using this air flow output.

Fluctuation of the output signal caused by turbulence in air flow, (i.e., occurrence of noise) is another factor that must be taken into consideration in an air flow detector of this sort. Such turbulence becomes significant when an obstruction exists in the vicinity of the exothermic resistor Rh, or when a drift air flow is generated inside the air passage (which is mainly attributable to the structure of the air passage), causing fluctuations in engine speed during idle operation in an automobile engine control. This additional factor is dealt with in the embodiments shown in FIGS. 7 and 8.

Figure 7:
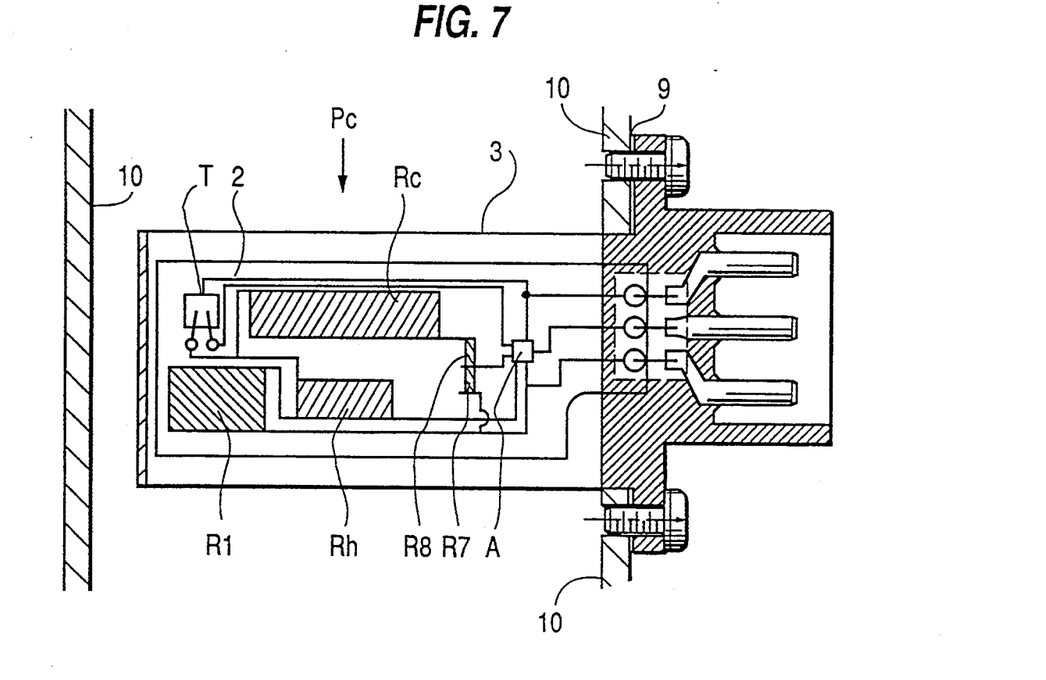
FIG. 7 is a vertical cross sectional view of another embodiment according to the present invention.
Figure 8:
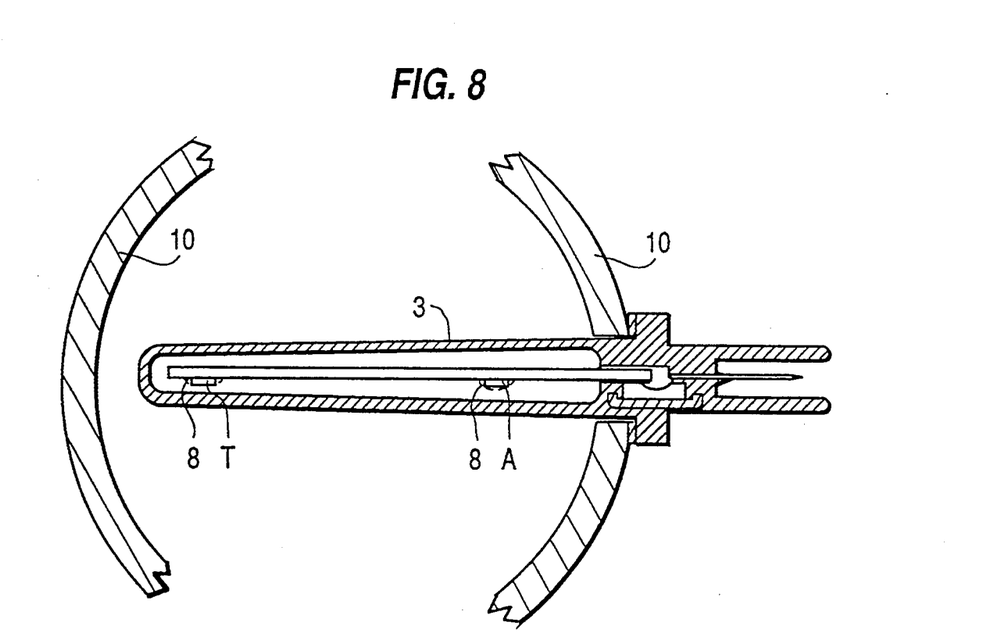
FIG. 8 is a horizontal cross sectional view of another embodiment according to the present invention.

In FIG. 7, a center of passage Pc has the most stable air flow inside an air intake tube 10, which serves as an air passage. Thus, the exothermic resistor Rh and air temperature detection resistor Rc (which is not a prerequisite) are placed there, and control circuits with a coating resin 8 such as a transistor T and a differential amplifier A are placed away from them on both sides in this embodiment. In this way, an air flow detector with excellent properties and little noise generation is provided because exothermic resistor Rh is placed at a point where air flow is most stable (that is, the center of passage Pc), and influence from turbulence in air flow due to the protruding control circuit with a coating resin 8, is reduced.

Figure 9:
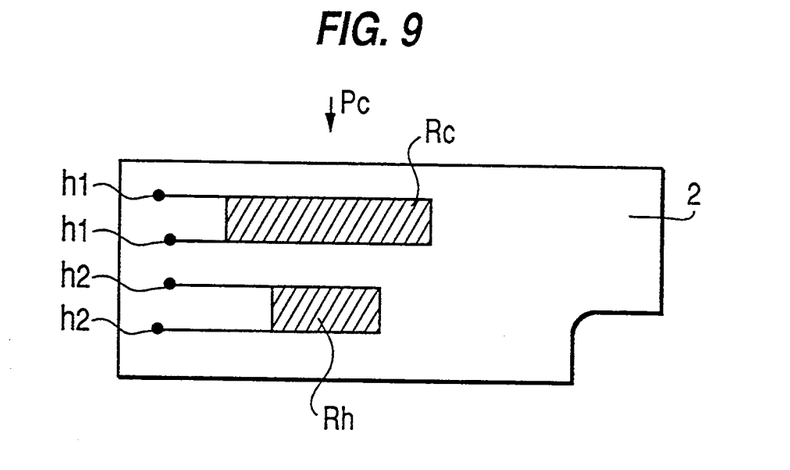
FIG. 9 is a front view of an embodiment of an insulated substrate according to the present invention.
Figure 10:
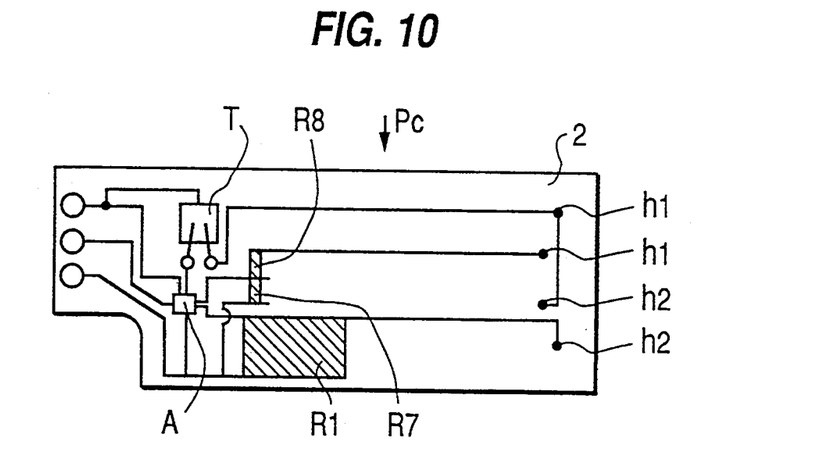
FIG. 10 is a rear view of an embodiment of an insulated substrate according to the present invention.

FIGS. 9 and 10 show an insulated substrate 2 in a further embodiment of the invention which is capable of reducing noise output. In this embodiment, exothermic resistor Rh and air temperature detection resistor Rc are formed on one surface of the insulated substrate 2 at the center of air passage Pc as shown in FIG. 9, and a control circuit comprised of a transistor T, a differential amplifier A and resistors R1, R2 and R7 are formed on the other surface, as shown in FIG. 10. The electric connection of one surface and the other surface of the insulated substrate 2 is realized via through holes h1 and h2. Because the turbulence in air flow on the surface on which the control circuit is situated does not reach the other surface in this embodiment, air flow is sufficiently stable at a point where exothermic resistor Rh is formed, further improving the SN ratio.

Figure 11:
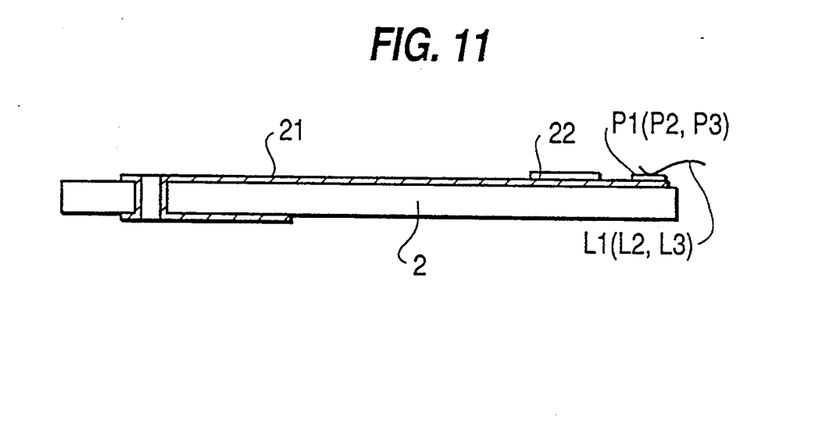
FIG. 11 shows the details of a through hole in an embodiment of an insulated substrate according to the present invention.

FIG. 11 shows the details of a through hole section in the embodiment shown in FIGS. 9 and 10. An insulated substrate 2 made of alumina ceramic in a green sheet state forms, for instance, a conductive metal film 21 using metal such as tungsten. It also forms an alumina film 22, and calcinates it to produce an alumina ceramic insulated substrate 2. The air flow detector in this embodiment is structured by forming an exothermic resistor Rh and a control circuit on the front and rear surfaces of the substrate, respectively. The alumina film 22 is provided to protect the circuit on the fixed section using an adhesive 7 which is shown in FIG. 1.

In addition to the method in this embodiment, formation of a through hole can also be achieved by using chemical plating methods on an insulated substrate 2.

While passive components such as the exothermic resistor Rh as well as the connecting circuit and a resistor of the control circuit in the foregoing embodiments are formed by a thick film using print, a thin film using vaporization or a combination of both can also be used. As previously noted, however, active components such as a transistor T and a differential amplifier A are discrete parts, and therefore constitute an obstruction that creates turbulence in air flow and generates noise in the output signal.

Figure 12:
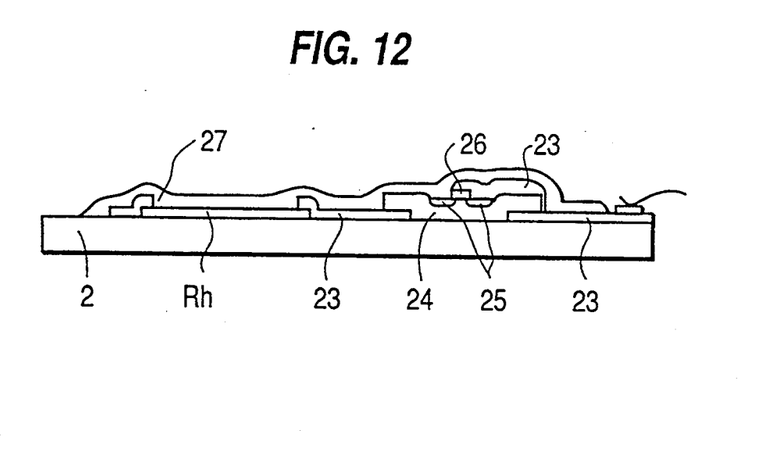
FIG. 12 shows another embodiment of an insulated substrate according to the present invention.

In contrast to the previous embodiments, the detector of FIG. 12 has active components structured as a thin-film semiconductor using a vaporization technique. That is, conductor 23 is formed by vaporization, as are semiconductor layers 24, 25 of Ga and As, both being covered by an insulated film 26. Semiconductor layers 24 and 25 form a MOS type transistor using the insulated film 26 as a gate insulation film, and structure a differential amplifier A in the circuit shown in FIG. 3. A glass vaporization film 27 coats and protects the whole circuit. Therefore, as active components also have a thin-film structure according to this embodiment, there is no concern for turbulence in air flow, and noise can be maintained at a sufficiently low level.

Figure 13:
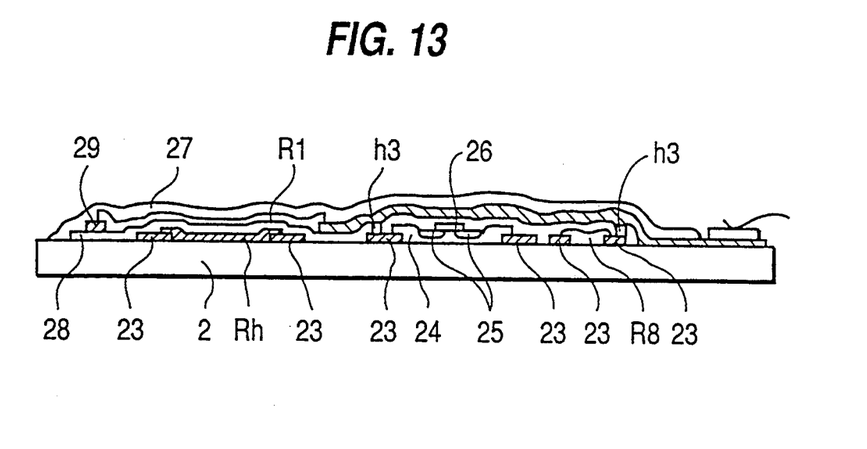
FIG. 13 shows yet another embodiment of an insulated substrate according to the present invention.

The embodiment in FIG. 13 has the same substrate as the embodiment in FIG. 12, but adds an insulating film 28 and an upper layer conductor 29 and is mounted as a multi-layer integrated circuit. This arrangement facilitates maximum integration of a thin film MOS transistor.

Figure 14:
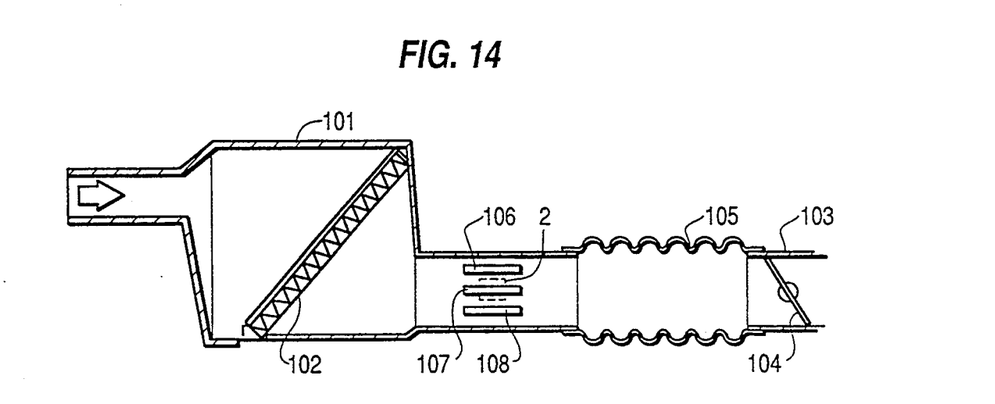
FIG. 14 is a cross sectional diagram of an embodiment applying an air flow detector according to the present invention to an air intake valve of an engine.

FIG. 14 is an embodiment of the present invention applied to an air intake system of an automobile engine, which includes an air cleaner box 101, an air filter 102, a throttle chamber 103, a throttle valve 104, a duct 105, current plates 106, 107 and 108. In this embodiment, air enters air cleaner box 101 from the direction of the arrow in the figure, passes through a throttle valve 104 and is sucked into the engine.

Current plates 106, 107 and 108 are provided to eliminate a convolution which occurs in the passage of air through the intake system in an engine of this type, which in turn generates air intake noise. One of the current plates 107, and the insulated substrate 2 are placed in direct contact. An exothermic resistor Rh and a control circuit are formed on the insulated substrate 2. Because the insulated substrate 2 is in direct contact with current plate 107, the heat generated from the control circuit is not only carried by air current and dispersed, but is also propagated to the current plate 107, which serves as a radiator, thereby realizing more efficient cooling. An air flow detector that can withstand the difficult condition of use in automobiles (high temperature), is thus provided in a simple manner.

Figure 15:
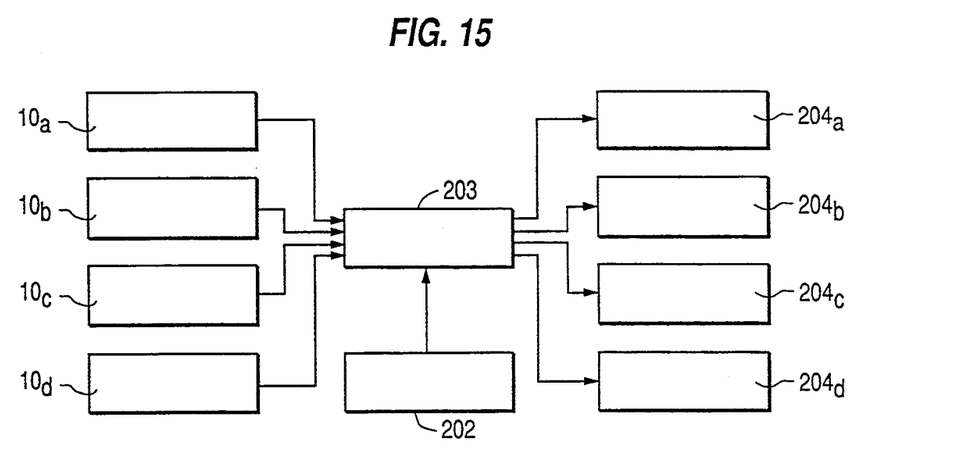
FIG. 15 is a schematic diagram of an embodiment of an engine control unit according to the present invention.

FIG. 15 is an embodiment of an engine control unit according to the present invention in which fuel control for an automobile engine is performed by placing four air flow detectors 10 on the air intake valves of the cylinders of an automobile engine (4 cylinders in this case). A control unit 203, which includes a microcomputer, is used to compute the optimum fuel volume to be supplied to each cylinder based on the air flow signal for each cylinder obtained from the respective air flow detectors 10a, 10b, 10c and 10d, and on the output signal from an engine rotation detector 202. The results of this computation are used to drive an injector 204 on each cylinder. Because air intake current is detected independently for each cylinder, and fuel supply volume is calculated accordingly in this embodiment, optimum fuel supply volume can be maintained at all times regardless of fluctuations in intake air flow between cylinders, thereby realizing an engine control system with clean exhaust gas.

In the air intake detectors according to the present invention, radiation of the control circuit is simplified and air flow is not disturbed. Thus, an automobile engine control system is provided which has a simple structure, has little output noise, easily offers a compact air flow detector, and can withstand the difficult temperature condition of an automobile.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Apparatus for detecting volume of a fluid flow in a fluid flow path, said apparatus comprising:

a heating element whose heat output is controlled by an amount of electric current provided thereto;

a control circuit for providing an electric current to said heating element and for detecting a quantity of heat transferred from said heating element by said fluid flow;

both of said control circuit and said heating element being adapted to be mounted in said fluid flow path in a position exposed to at least a substantial portion of said fluid flow, whereby heat generated by said heating element and by said control circuit is transferred to said fluid, and at least said control circuit is cooled by said fluid flow, and at least said control circuit is cooled by said fluid flow.

2. Apparatus according to claim 1, wherein said control circuit and said heating element are mounted on a surface of an insulated substrate.

3. Apparatus according to claim 2, wherein said heating element is an exothermic resistor.

4. An apparatus according to claim 3, wherein said exothermic resistor is a film-type resistor formed on a surface of said insulated substrate.

5. Apparatus according to claim 4, wherein said control circuit comprises at least one resistive element formed as a film on a surface of said insulated substrate.

6. Apparatus according to claim 5, wherein said fluid flow path comprises a fluid intake passage having an opening therein, said control circuit and said exothermic resistor being adapted to be inserted into said intake passage through said opening.

7. Apparatus according to claim 6, wherein said fluid intake passage has a substantially circular cross section.

8. Apparatus according to claim 7 wherein said control circuit and said exothermic resistor are positioned substantially at a central portion of said fluid intake passage.

9. Apparatus according to claim 8, wherein said exothermic resistor is positioned substantially at a central portion of said fluid intake passage and said control circuit is positioned at an edge of said fluid intake passage.

10. Apparatus according to claim 9, wherein said exothermic resistor is formed on a first surface of said insulated substrate and said control circuit is positioned on a second surface of said insulated substrate which is opposite said first surface.

11. Method of using a detector for detecting volume of a fluid flow in a fluid flow path, said detector having a heating element whose heat output is controlled by an electric current provided thereto, and a control circuit for providing an electric current to the heating element and for detecting a quantity of heat transferred from said heating element to said fluid flow, said method comprising the step of:

placing both of said control circuit and said heating element in said fluid flow path in a position exposed to at least a substantial portion of said fluid flow, whereby heat generated by said heating element and by said control circuit is transferred to said fluid, and at least said control circuit is cooled by said fluid flow.

12. Method according to claim 11, wherein said control circuit and said heating element are mounted on a common carrier element.

13. Method according to claim 12, wherein said control circuit and said heating element are positioned at a location which is substantially at a center of cross section of said fluid flow.

14. Method according to claim 13, wherein said heating element is an exothermic resistor.

15. Method of measuring volume of a fluid flow in a fluid flow path, said method comprising the steps of:

providing a heating element having a heat output controlled by an electric current supplied thereto;

supplying an electric current to said heating element;

providing a control circuit which detects heat from said heating element and controls said electric current in response thereto;

placing said heating element and said control circuit in said fluid flow path in a position exposed to at least a substantial portion of said fluid flow, whereby heat from said heating element and from said control circuit is transferred to said fluid, and at least said control circuit is cooled by said fluid flow; and measuring said electric current.

16. Method according to claim 15, wherein said control circuit and said heating element are mounted on a surface of an insulated substrate.

17. Method according to claim 16, wherein said heating element is an exothermic resistor.

18. Method according to claim 17, wherein said exothermic resistor is a film type resistor formed on a surface of said insulated substrate.

19. Method according to claim 18, wherein said control circuit comprises at least one resistive element formed as a film on a surface of said insulated substrate.

20. Method according to claim 19, wherein said fluid flow path comprises a fluid intake passage having an opening therein, said control circuit and said exothermic resistor being adapted to be inserted into said intake passage through said opening.

21. Method according to claim 20, wherein said fluid intake passage has a substantially circular cross section.

22. Method according to claim 21, wherein said control circuit and said exothermic resistor are positioned substantially at a central portion of said fluid intake passage.

23. Method according to claim 22, wherein said exothermic resistor is positioned substantially at a central portion of said fluid intake passage and said control circuit is positioned at an edge of said fluid intake passage.

24. Method according to claim 23, wherein said exothermic resistor is formed on a first surface of said insulated substrate and said control circuit is positioned on a second surface of said insulated substrate which is opposite said first surface.

25. System for detecting fluid flow in fluid intake passage of each cylinder of an engine having a multiplicity of cylinders, comprising:

a multiplicity of fluid flow detector circuits, each comprising an exothermic resistor and a control circuit for supplying an electric current to said exothermic resistor and for measuring a quantity of heat transferred from said exothermic resistor by a fluid flow;

both the exothermic resistor and the control circuit of one such fluid flow detector circuit being placed in a fluid intake passage for each respective cylinder of said engine, whereby at least said control circuit is cooled by said fluid flow.

26. A fluid flow detector comprising:

an exothermic resistor;

fluid temperature detection resistor;

a control circuit for controlling a flow of electric current to said exothermic resistor and to said fluid temperature detection resistor; and means for measuring current flowing in said exothermic resistor;

said exothermic resistor, said fluid temperature detection resistor, and said control circuit being arranged in and exposed to at least a substantial portion of said fluid flow, whereby heat generated thereby is transferred to said fluid, and at least said control circuit is cooled by said fluid flow.

27. Detector according to claim 26, wherein said exothermic resistor and said fluid temperature detection resistor are connected in parallel.

28. Detector according to claim 27, wherein said fluid temperature detection resistor is arranged in proximity to said exothermic resistor and upstream therefrom relative to a direction of said fluid flow.

29. Detector according to claim 28, wherein said exothermic resistor and said fluid temperature detection resistor are connected in opposite branches of a bridge circuit.

30. Detector according to claim 29, wherein said control circuit comprises:

a differential amplifier having inputs connected to said opposite branches of said bridge circuit; and a transistor which is coupled to control a flow of current to said bridge circuit;

said differential amplifier having an output which is connected to a base of said transistor.

31. Apparatus for detecting volume of a fluid flow in a fluid flow path, said apparatus comprising:

a heating element whose heat output is controlled by an amount of electric current provided thereto;

a control circuit for providing an electric current to said heating element and for detecting a quantity of heat transferred from said heating element by said fluid flow;

both of said control circuit and said heating element being adapted to be mounted in said fluid flow, whereby heat generated by said heating element and by said control circuit is transferred to said fluid.

* * * * *